Patented Sept. 7, 1943

2,329,172

UNITED STATES PATENT OFFICE 2,329,172

PROCESS FOR MAKING UREA-FORMALDEHYDE MOLDING COMPOSITIONS AND PRODUCTS THEREFROM

Leonard Smidth, Houston, Tex.

No Drawing. Application April 3, 1933,
Serial No. 664,207

7 Claims. (Cl. 260—9)

The invention is concerned with the reaction products of urea or equivalent substances with formaldehyde or equivalent substances.

An object of my invention is to uniformly produce a superior hot molding composition of increased plasticity or "flow" and rapid "cure." Another object is to quickly and uniformly produce a molding composition in any given color or "flow" from a single condensation product. A further object is to produce homogeneous molded products of increased strength and durability and decreased brittleness by subjecting my molding composition to the combined action of heat and pressure.

In preparing molding compositions from urea and formaldehyde which quickly "set" when placed in a mold and subjected to the combined action of heat and pressure, trouble is experienced because of the lack of "flow" of the composition when the pressure is applied thereto. This lack of "flow" in the mold is usually caused by the reaction in the composition having progressed too far before the composition is placed in the mold, i. e., the composition is partially "set" and does not readily take the shape of the mold.

I have discovered that by adding thiourea or urea, preferably thiourea, to the composition before it is placed in the mold the "flow" of the composition will be increased when the composition is subjected to the combined action of heat and pressure in the mold.

In practice, the thiourea or urea in its crystalline form is preferably pulverized and then added to the molded composition in its pulverized form. The molded composition with its added thiourea or urea is then thoroughly mixed to form a homogeneous mass before it is placed in the mold. I have found that if the thiourea or urea is not thoroughly pulverized and mixed with the molding composition, the molded product tends to be "spotty."

The proportion of thiourea or urea to the molding composition may vary within quite wide limits but should be less than 10% (ten percent) by weight of the molding composition and should, preferably, be in excess of that which would react with the formaldehyde present in the composition so that there will be free thiourea or urea present in the molding composition.

For example, a urea formaldehyde molding composition was produced according to my co-pending application, Serial No. 363,397 filed May 15, 1929, as follows: 100 g. of urea was reacted with 200 cc. of formaldehyde. The pH of the solution was 6.0. This was then mixed with 80 g. of paper. The mixture was dried and pulverized.

When the above molding composition was placed in a given hot mold and subjected to a given pressure without the addition of free urea it required thirty seconds to close the mold.

When 100 g. of the said molding composition was thoroughly ground with 5 g. of urea this composition was placed in the same mold under the same conditions and it required only eight seconds to close the mold.

The thiourea is preferable to urea because not only does it plasticize the composition but also it acts as an accelerating agent during the molding. It is ideal for this purpose because it does not appreciably increase the acidity of the composition, and thus the stability of the composition is not affected. During the hot molding process sufficient ammonium thiocyanate is formed to greatly accelerate the reaction. (When thiourea is heated it forms an equilibrium mixture with ammonium thiocyanate.) It is not desirable to add much more thiourea than 5% if an ordinary steel mold is used, because it will tend to stain the mold.

Another advantage is that a composition can be prepared from urea and formaldehyde containing less than the required proportion of urea to formaldehyde during the reaction and drying process such composition being more stable because of the excess formaldehyde. (The optimum proportions, namely, between 1.05 to 1.40 moles of urea to 2 moles of formaldehyde are set forth in co-pending application Serial No. 363,397.) Then the required amount of dry urea or thiourea is mixed with the composition and the reaction goes to completion during the molding process. For example, 1 mole of urea was reacted with 2 moles of 40% formaldehyde solution (pH 6.0) by boiling until a test sample did not become cloudy on cooling. About 25% of water was removed by distilling under vacuo and the viscous product poured into shallow trays. It was then hardened at 60° C. until it could be disintegrated to a fine powder. Then 0.25 mole of finely powdered urea, or thiourea or a mixture of the two was intimately mixed therewith. This gave a stable molding composition which readily flowed in the hot mold and gave a molded product resistant to weather.

One disadvantage of using dry urea or thiourea is that unless it is thoroughly mixed or ground with the composition it will tend to be "spotty." If a pebble mill is used to grind in the thiourea or urea it will be found that the composition becomes "stiffer" as the grinding proceeds, thus neutralizing the effect of the addition. Another disadvantage is that since the flow of the different compositions vary and thus the amount of thiourea or urea added differ proportionately, the composition will vary in the ratio of urea to formaldehyde. Accordingly, the invention hereafter shown gives a method of overcoming both of the above disadvantages and is set forth in application Serial No. 514,544, filed June 1, 1931.

Urea formaldehyde molding compositions containing paper as fillers which are in use commercially, are described in my co-pending application Serial No. 363,397, filed May 15, 1929. These are made by reacting a urea with formaldehyde and then mixing or masticating the condensation product with paper. The material is then dried, usually with the application of heat. During the drying process, the composition is partially converted to the final infusible, insoluble state. The nearer the reaction is to completion, the greater is the resistance of the composition to flow. Different batches tend to vary in their flow even when dried under the same conditions, due to variables which are difficult, if not practically impossible to control. It is this variation of the batches which makes it difficult to make molding compositions of uniform flow. Great caution has to be exercised to produce a composition which will flow properly. If the material before it is pulverized is not sufficiently dry it will not pulverize readily. The pulverizing stage is normally reached while the material still contains moisture. At this stage the moisture may equal 5 to 10%. If the drying is carried too far, the resultant material will not flow readily enough. One method of accomplishing a uniform flow is to mix a large number of batches together, thus getting an average, but this is cumbersome and not always satisfactory.

The principal object of this invention, accordingly is to provide a process for manufacturing a superior urea-formaldehyde molding composition which has a substantially uniform flow under heat and pressure and which yields products that have a high resistance to boiling water and other desirable characteristics as found in such commercial products.

I have found in accordance with this invention that a urea-formaldehyde molding composition of uniform flow can be obtained simply by adding to such a molding composition a solution of a urea and formaldehyde or preferably their reaction products in order to make it as plastic as desired. In other words, I can heat my urea-formaldehyde molding composition until I am certain it is dry and so that it pulverizes easily, and regardless of how "stiff" (i. e., flow resistant) the composition has become, I can make it any flow I wish, simply by the addition of the urea-formaldehyde solution. The more of such solution I add the more plastic will be the composition. A convenient way of making the urea-formaldehyde solution is from 40% aqueous formalin solution and a urea. The presence of water or other solvents does not appreciably affect it, and although it is preferable to distill off part of the water either with or without vacuum, I have found that it is not disadvantageous if moderate amounts of water, or other solvents, are present. The urea-formaldehyde solution may be added up to 20% by weight without appreciably affecting the molded product.

*Example 1.*—100 pounds of urea were dissolved in 216 pounds of formaldehyde (pH 6.0) heated to 30° C. This was mixed with 50 pounds of alpha fibre, followed by drying to completion with heat and reduction to powder. This powder in a given mold required 30 seconds for the closing. A solution made by heating 5 pounds of urea in 10 pounds of 40% formalin (pH 3.0) to 50° C. was added and 8 seconds were now required to close the same mold.

*Example 2.*—100 pounds of urea were dissolved in 216 pounds of formaldehyde (pH 6.0) heated to 30° C. This was mixed with 50 pounds of alpha fibre, followed by drying to completion with heat and reduction to powder. This powder in a given mold requires 30 seconds for the closing. A solution made by heating 5 pounds of thiourea in 10 pounds of 40% formalin (pH 3.0) to 50° C. was added and 8 seconds were required to close the same mold.

*Example 3.*—Instead of adding the solution of 5 pounds of urea in 10 pounds of formalin, as in Example 1, 15 pounds of solution made in the same way (1 part of urea in 2 parts of 40% formalin) but 25% by weight of water was removed under vacuum and the flow reduced in the same manner.

*Example 4.*—Instead of adding the solution of urea in formalin, 5 pounds of paraformaldehyde and 5 pounds of urea were added to 5 pounds of triethanolamine. If this is heated to cause solution and partial reaction, the resulting mixture can be used to increase plasticity of urea-formaldehyde molding compositions.

*Example 5.*—5 pounds of urea and 5 pounds of paraformaldehyde were added to 5 pounds of a 1 to 1 mixture of ethyl alcohol and water, and the mixture heated. The resulting opaque fluid was then mixed with urea-formaldehyde molding compositions and its plasticity was accordingly increased.

The molding compositions made in accordance with the above examples have a quick uniform flow and give excellent molded articles. The products possess the resistance to boiling water and other characteristics desired commercially.

Of course the dried molding composition may be prepared with a molar proportion of urea less than desired in the final product. In such case the "softening" mixture should contain a sufficient excess of urea to make up for the deficiency. The greater the proportion of formaldehyde reacted with urea in the dried composition, the greater will be its plasticity, while the greater proportion of urea in the liquid mixture, the greater will be the plasticity. A formaldehyde rich "softening" mixture could be added to a molding composition containing an excess of urea but usually is not desired since the formaldehyde is in water solution and the addition of any substantial quantity of aqueous formaldehyde would wet the powder too much. However, this can be overcome by using solid forms of formaldehyde, such as paraform or hexamethylene-tetramine dissolved in a small proportion of a mutual solvent with urea.

Molded products prepared from urea-formaldehyde molding compositions are relatively brittle. In order to decrease the brittleness and increase the elasticity it is necessary to have some material present which acts as a softener. I have found that if I add plasticizers, such as are used in other resins to decrease the brittleness, they do not mix readily. After molding, the molded article is found to "sweat out" the added softeners. Some substances which are soluble in the urea formalin mixture, such as glycerin, can be used as softening agents for the molded product, but their water solubility cuts down the product's resistance to water and weathering so that their use is not desirable.

I have found that the reason that substances which are the most desirable softeners cannot be used, is due to the water present (or formed during the molded process) the presence of which cuts down the solubility of the plasticizer. I have found that in order to mix the softener with a urea-formaldehyde molding composition prepared in ordinary way from urea and formalin it is necessary that the water content of the mixture be kept very low. If the urea-formaldehyde molding composition is heated in order to dry it and reduce the water content sufficiently low, and the softener added, the mixture will be found to be so stiff that it has little value as a molding composition.

Now I have found that if I continue the drying of my urea-formaldehyde molding compositions (e. g., as prepared in my co-pending application Serial No. 363,397, filed May 15, 1929) until the water content is very low, I can add my plasticizing mixture consisting of a urea-formaldehyde condensation product in the presence of a nonaqueous solvent and a softener. The preparation of a urea-formaldehyde condensation product in liquid solution substantially free of water is relatively expensive and in the process outlined above no more than 20% of this expensive water-free mixture need be used. I find that the composition so prepared is more stable on standing than one made directly from urea formalin or plasticized by one. Such composition has better molding characteristics, i. e., the flow of the material when the mold is closed is more even. The final molded product containing the softener is less brittle. The fact that there is less water present makes the molded product less likely to blister on account of less gas present during the molding operation. Also because little water is present a higher temperature and thus a shorter time in the mold is required.

Several methods for preparing liquid plasticizing mixtures free from water can be used in which the most of the common softeners are soluble.

1. Formaldehyde in solution in organic solvent is reacted with urea.
2. Dry dimethylol urea in an organic solvent is reacted with formaldehyde.
3. Urea and aqueous formaldehyde is reacted and the water present is taken off by means of binary, ternary, etc. mixtures of organic solvents.
4. Paraformaldehyde or solid polymers of formaldehyde are reacted with urea, and either during or after reacting organic solvents are added.

Examples of "softeners" which may be used alone or mixed in accordance with this invention are as follows: The diethyl or dibutyl esters of oxalic, tartaric, or phthalic acid, p-toluol sulphonamide resin, benzyl alcohol, borneol, camphor, glycol or glyceryl esters, acetanilide, vinyl resins, cellulose esters and the like.

The following is an example of carrying out my invention:

5 pounds paraform was stirred with 2 pounds Cellosolve. There was not complete solution. The mixture was then acidified with acetic acid so that a test made with a portion dissolved in distilled water gave a pH of approximately 5. 6 pounds of urea were dissolved in 1 pound Cellosolve and this solution slowly poured into the boiling paraform mixture. Boiling was continued until the solution became viscous. The solution when cold was sticky and viscous, and was not entirely clear. When heated, it became mobile and less viscous and did not show any tendency to gelatinize. If 2 pounds of triethanolamine were mixed with the paraform Cellosolve mixture, the final solution obtained would be found clear and transparent. 5 pounds of dibutyl phthalate was added to the mixture in which it was soluble. The plasticizing mixture was then added to 100 pounds of a thoroughly dried urea-formaldehyde molding composition prepared according to my aforementioned copending application Serial No. 363,397. The pH of a distilled water extract of the plasticized molding composition was 6.5. Before adding the plasticizing mixture the composition was so "stiff" that it hardly flowed in the mold but after the addition it became very plastic.

Many advantages arise from the use of my liquid plasticizing mixture. It is desirable to prepare the molding composition in coarse or granular form so that blanks may be readily prepared on a preforming or tablet machine. In order to obtain a homogeneous mixture of a condensation product including a filler, pigment, lake or dye, and possibly a mold lubricant, it is generally necessary to grind the mixture to a fine powder in a pebble mill. Now I have found that I can readily obtain a granular coarse molding composition from a mixture plasticized with my fluid condensate in several ways. One method is to run the fine powder through warm (preferably not over 60° C.) or cold rolls whose surface is covered by the liquid plasticizing mixture (preferably by spraying). This gives sheets or sections which may be ground to desired size. Another method is to place the molding composition and liquid plasticizing mixture in a suitable mill, mixer, or masticator. Either heat is applied or else the mixture is stirred until the temperature is raised by the heat of reaction until a cake is formed. After cooling and spontaneous or forced drying, the cake is then broken down to the required granule sizes. Still another method is to take the composition wetted with the liquid plasticizing mixture and force it through a sieve or screen of a given size by means of a rubbing or rolling action.

Another feature of the above invention is that it is adapted to the commercial production of a large variety of products in an economical way. For example, it is desirable to have available molding compositions in a large number of different colors. Again it is desirable to make a molding composition to match any color at will. Then compositions with different flows would be desirable with different molds. For tall objects which are molded in a deep die, a very plastic material is more suitable, whereas a flat die would require the use of a "stiffer" composition. To prepare and dry each one of these variations as they are required would be tedious and expensive, requiring the frequent cleaning of all apparatus. To stock all colors would be impossible. The fact that a great many compositions stiffen on standing adds to the difficulties.

The above invention shows a way to first prepare and dry the uncolored molding composition which can be used as a basis for quickly preparing molding compositions of practically any desired color or flow. A large stock of powdered dry uncolored material is kept on hand. When a specific color is desired the pigment, lake or dye is added to the uncolored powder and the whole thoroughly mixed. Then the plasticizing mixture is added to regulate the "flow" to that desired. Since during the mixing and grinding process the composition will tend to set or "stiffen" it is best to add the plasticizing mixture after the mixing and grinding process. If a "stiffer" material than that obtained after the grinding is desired, the composition is kept in the mill until the desired "flow" is obtained.

Instead of urea, thiourea or substitution products of urea or of thiourea may be used in so far as they are not specifically limited, all of which I wish to be included along with urea in the designation "urea" used in the following claims. The formaldehyde may be used either in the commercial aqueous solution or in the gaseous state or in the form of a solution of anhydrous formaldehyde or in the form of the polymers.

Thus while I have described my improvement in detail and with respect to certain preferred forms, I do not desire to be limited to such details or forms since, as will be noticed by those skilled in the art, after understanding my invention many changes and modifications may be made and the invention embodied in widely different forms without departing from the spirit and scope thereof in its broader aspects, and I desire to cover all modifications, forms and improvements coming within the scope of any one or more of the appended claims.

This application is a continuation in part of application Serial Nos. 422,544, filed Jan. 22, 1930, now Patent No. 2,209,943, dated July 30, 1940; 541,544 filed June 1, 1931.

Compositions comprising fusible reaction products of urea and formaldehyde and a latent catalyst or accelerating agent and the process of resinifying such products by heat and pressure are not claimed herein since such compositions and process are claimed in my co-pending U. S. application Serial No. 489,099, filed May 29, 1943.

Having thus described my invention what I claim as new and desire to secure by Letters Patent is:

1. A free-flowing molding powder comprising a powdered solid intermediate condensation product of a urea and formaldehyde containing a cellulose filler, the powder containing not more than 20% by weight of an absorbed liquid selected from the group consisting of (a) a solution of a urea and formaldehyde, and (b) a solution of a urea-formaldehyde reaction product, the sum of the absorbed urea and formaldehyde in the total mass being in a mole ratio of between 1.05 to 1.40 of urea to 2 of formaldehyde, said absorbed liquid imparting to the molding powder an increased plasticity in the mold under heat and pressure.

2. A free-flowing molding powder as recited in claim 1, in which the absorbed liquid is aqueous.

3. A free-flowing molding powder as recited in claim 1, in which the absorbed liquid comprises an organic solvent.

4. A free-flowing molding powder comprising a powdered solid intermediate condensation product of a urea and formaldehyde containing a cellulose filler, the mole ratio of the urea therein being less than 1.40 moles of urea to 2 moles of formaldehyde, the powder containing not more than 20% by weight of an absorbed liquid selected from the group consisting of (a) a solution of a urea and formaldehyde, and (b) a solution of a urea-formaldehyde reaction product, said liquid containing sufficient excess urea to give a mole ratio of urea to formaldehyde in the total mass of between 1.05 to 1.40 of urea to 2 of formaldehyde, said absorbed liquid imparting to the molding powder an increased plasticity in the mold under heat and pressure.

5. A free-flowing molding powder comprising a powdered solid intermediate condensation product of a urea and formaldehyde containing a cellulose filler, the mole ratio of formaldehyde therein being less than 2 moles of formaldehyde to 1.40 moles of urea, the powder containing not more than 20% by weight of an absorbed liquid selected from the group consisting of (a) a solution of a urea and formaldehyde, and (b) a solution of a urea-formaldehyde reaction product, said liquid containing sufficient excess formaldehyde to give a mole ratio of urea to formaldehyde in the total mass of between 1.05 to 1.40 of urea to 2 of formaldehyde, said absorbed liquid imparting to the molding powder an increased plasticity in the mold under heat and pressure.

6. A free-flowing molding powder as recited in claim 1, in which the absorbed liquid contains a softening agent for the solid condensation product.

7. A process of making a free-flowing molding powder comprising drying a solid urea-formaldehyde intermediate condensation product containing a cellulose filler until the solid is readily pulverizable, pulverizing said solid condensation product to form a powder, and mixing said powder with not more than 20% by weight of a liquid selected from the group consisting of (a) a solution of a urea and formaldehyde and (b) a solution of a urea-formaldehyde reaction product, the sum of the absorbed urea and formaldehyde in the total mass being in a mole ratio of between 1.05 to 1.40 of urea to 2 of formaldehyde, said absorbed liquid imparting to the molding powder an increased plasticity in the mold under heat and pressure.

LEONARD SMIDTH.

CERTIFICATE OF CORRECTION.

Patent No. 2,329,172. September 7, 1943.

LEONARD SMIDTH.

It is hereby certified that error appears in the printed specification of the above numbered patent requiring correction as follows: Page 3, second column, line 18, for "6.5" read --5.5--; and that the said Letters Patent should be read with this correction therein that the same may conform to the record of the case in the Patent Office.

Signed and sealed this 23rd day of November, A. D. 1943.

(Seal)

Henry Van Arsdale,
Acting Commissioner of Patents.